Sept. 19, 1961   R. P. LOGEROT   3,000,178
EJECTION NOZZLES HAVING VARIABLE CROSS-SECTIONAL AREA
Filed Aug. 5, 1958   3 Sheets-Sheet 1

INVENTOR
René Paul Logerot
By
Watson, Cole, Grindle & Watson

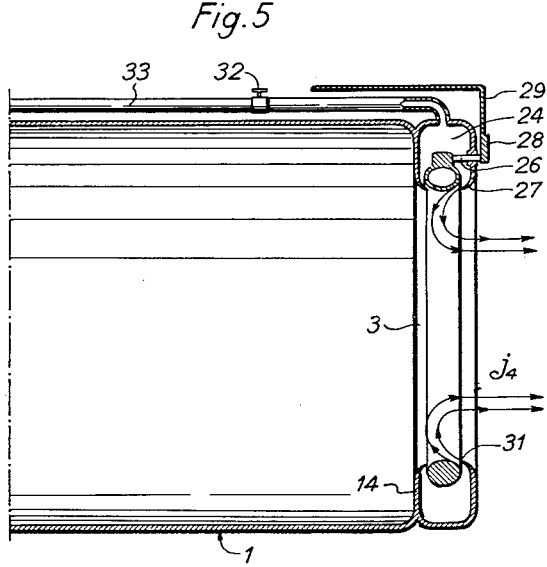
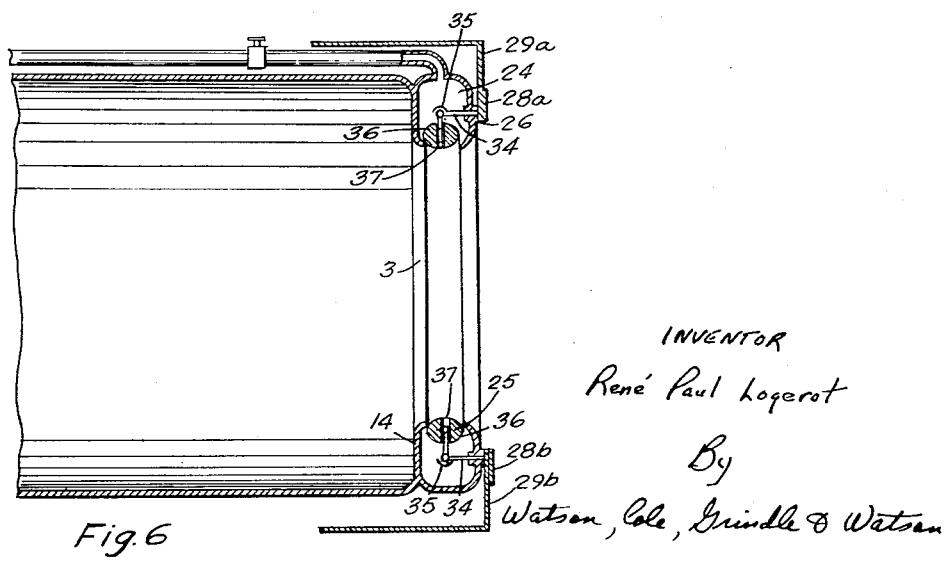

3,000,178
**EJECTION NOZZLES HAVING VARIABLE
CROSS-SECTIONAL AREA**
René Paul Logerot, Paris, France, assignor to Societe
Nationale d'Etude et de Construction de Moteurs
d'Aviation, Paris, France, a French company
Filed Aug. 5, 1958, Ser. No. 753,349
Claims priority, application France Sept. 16, 1957
3 Claims. (Cl. 60—35.6)

In ejection nozzles of which the loads are very variable, as is the case in particular in those provided in turbo-jet units with after-combustion, it is necessary to be able to vary the cross-sectional ejection area to a considerable extent.

Adjustment of this cross-sectional ejection area by means of movable mechanical obstacles involves limitation of the temperature of the ejection gases to a value compatible with high strength of the materials of which these obstacles are formed, whereby the output of the said jet units is limited.

Adjustment by pneumatic striction of the jet with the aid of a transverse auxiliary jet, while permitting high temperatures of the gases of the propulsive jet, has the disadvantage of necessitating a prohibitive rate of flow of auxiliary gas for this striction when small cross-sectional ejection areas must be obtained.

The present invention has for its object to provide an improved device for adjusting the cross-sectional area of a jet nozzle, which device is not attended by the aforesaid disadvantages but permits of varying the cross-sectional ejection area to a considerable extent.

The said device comprises essentially, on the one hand, means forming at the outlet of the nozzle a solid or gaseous annular barrier which constitutes a diaphragm reducing the effective cross-sectional area of the said nozzle and, on the other hand, one or more ducts combined with the said means forming the barrier and appropriate for producing an auxiliary jet, the aerodynamic action of which is so exerted as substantially to modify the diaphragm effect of the barrier, either in the sense of a reduction or in the sense of an increase.

The description given in the following with reference to the accompanying drawings will enable the various features of the invention and the manner in which they are put into practice to be readily understood, any means apparent either from the text or from the figures naturally remaining within the scope of the present invention.

FIGURES 4 and 5 show, again in axial section, another variant similar to that of FIGURE 3.

FIGURE 6 shows diagrammatically another modified form of the invention.

Figure 1:
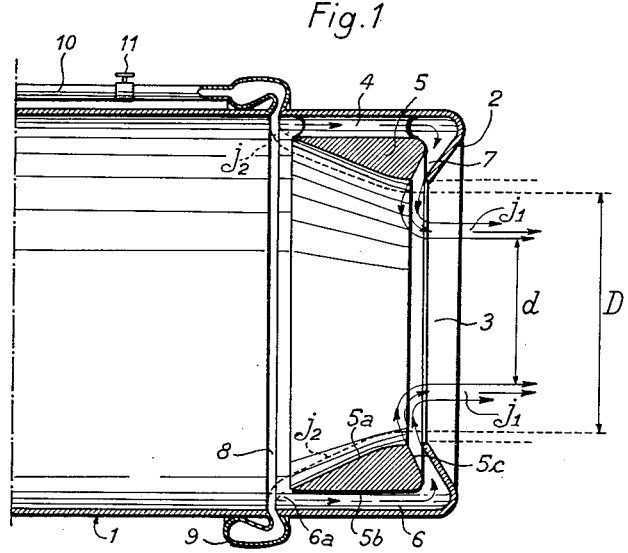
FIGURES 1 and 2 are diagrammatic axial sectional views of two constructional forms according to the invention, in which the diaphragm effect of a gaseous annular barrier can be considerably reduced.

In the example of FIGURE 1, there will be seen at 1 the terminal portion of a jet propulsion unit, which may be a turbo-jet unit equipped with an after-combustion device and the wall of which is extended by an annular rim 2 inclined in the upstream direction and defining a circular outlet orifice 3. Secured to this wall by radial arms 4 is an annular body 5 having an inner face 5a which forms the convergent outlet nozzle proper, an outer face 5b defining with the wall 1 an annular passage 6, and finally a rear face 5c which forms with the extension 2 a circular duct or slot inclined in the upstream direction and surrounding the outlet orifice 3.

The annular passage 6 extracts a part of the main flow through its inlet 6a directed upstream, and feeds the duct 7, which then produces an annular jet $j_1$ substantially perpendicular to the said flow and exerts on the latter an aerodynamic striction effect equivalent to a reduction of the cross-sectional outlet area of the nozzle to a value corresponding to the diameter $d$.

Such an arrangement producing an aerodynamic striction by upstream extraction from the flow to be controlled has been described by applicants in the fourth certificate of addition No. 65,303 of February 11, 1954, to French Patent No. 1,030,483 of January 4, 1951.

In accordance with the present invention, the striction device just described is combined with a circular port 8 formed through the wall 1 in the neighbourhood of the inlet 6a of the annular passage 6. The said port, which is transversely oriented or preferably inclined in the upstream direction, is fed by a header 9 connected by a pipe 10 provided with a valve 11 to an appropriate source of fluid under pressure, for example the air compressor or the main combustion chamber of the turbo-jet unit.

When it is desired to increase the cross-sectional outlet area of the nozzle, for example for operation with after-combustion, the valve 11 is opened so that the fluid under pressure reaching the header 9 escapes through the port 8 and expands to form an annular jet $j_2$ which obstructs the inlet 6a of the annular passage 6 and deflects the main flow towards the axis. Since the striction slot 7 is no longer fed and the auxiliary jet $j_2$ is downwardly directed against the inner face 5a of the annular body 5, the effective cross-sectional area of the nozzle is increased to the value corresponding to the diameter $D$.

Naturally, any intermediate value between the minimum value $d$ and the maximum value $D$ of the effective diameter of the nozzle can be obtained by varying the opening of the valve 11.

Figure 2:
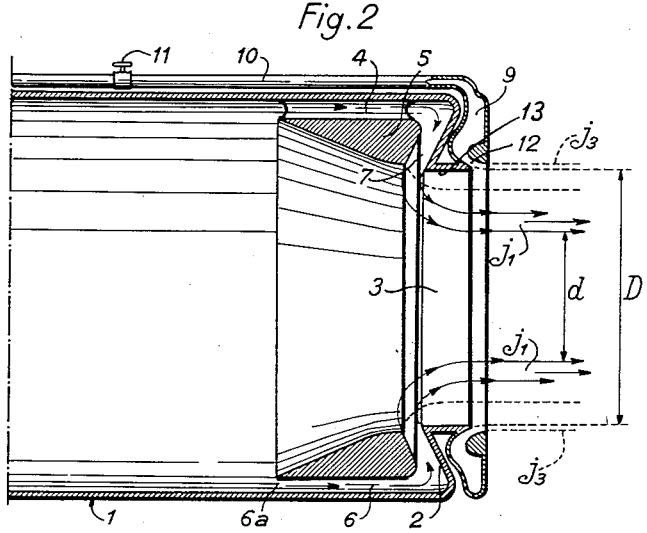

In the variant illustrated in FIGURE 2, the outlet orifice 3 of the nozzle is surrounded by a short cylindrical wall 13 situated downstream of the striction slot 7, which it separates from an auxiliary slot 12 directed rearwardly and substantially tangentially to the said wall 13.

When the valve 11 is open, the auxiliary slot 12 produces an annular jet $j_3$ tangential to the wall 13 and in prolongation thereof. The said annular jet tends to cause the boundary layers of the main flow (in the present instance the fluid sleeve formed by the striction jet $j_1$) to adhere to the cylindrical wall 13, the effect of which is to increase the effective diameter of the nozzle from the value $d$ to the value $D$.

As in the previous case, effective diameters of any intermediate value may be obtained by adjusting the valve 11.

The two arrangements hereinbefore described permit of reducing the diaphragm effect exerted by an annular barrier consisting of a striction jet on the main flow.

The present invention also provides the possibility of increasing the diaphragm effect or, what amounts to the same thing, of further reducing the effective cross-sectional area of a nozzle.

Figure 3:
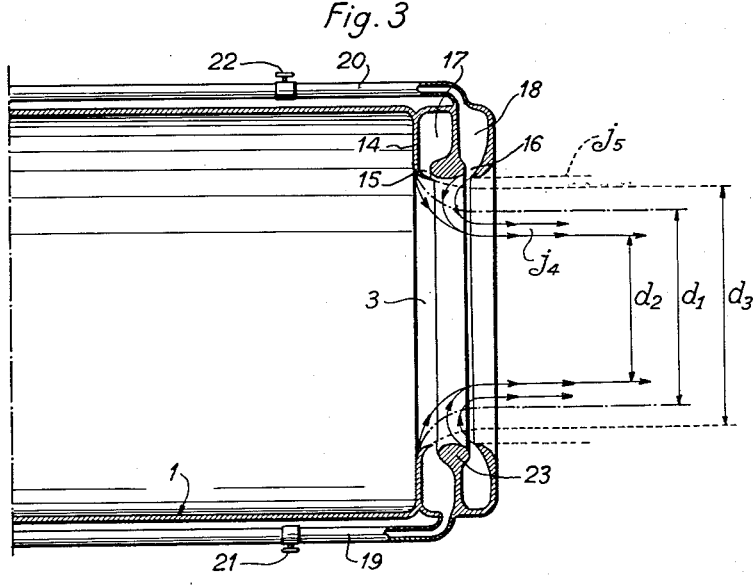
FIGURE 3 is a similar sectional view of a variant in which the diaphragm effect of a solid annular barrier can be increased or decreased as desired.

In the example of FIGURE 3, the annular barrier consists of a solid diaphragm 14 to which there extend on the downstream side two annular slots 15 and 16 communicating with headers 17 and 18 connected to the air compressor or other source of fluid under pressure by pipes 19 and 20 provided with valves 21 and 22. The first slot 15 is rearwardly directed substantially tangentially to an annular wall 23, while the second slot 16 is steeply inclined in the upstream direction.

The contraction of the flow which is effected by the diaphragm 14, without any aerodynamic action, gives a mean effective diameter $d_1$. If it is desired to reduce this value the valve 22 feeding the slot 16 is opened and the said slot then gives a striction jet $j_4$ which throttles the fluid stream and gives an effective diameter represented by $d_2$.

If, on the other hand, it is desired to increase the said effective diameter to a maximum value $d_3$, the valve 21 is opened, the valve 22 being closed. The tangential jet $j_5$ produced by the slot 15 exerts a blowing action similar to that of the jet $j_3$ of FIGURE 2.

The valves 21 and 22 provided in the pipes 19 and 20 respectively, which feed the headers 17 and 18, permit of obtaining any desired intermediate values between the extreme values $d_2$ and $d_3$ corresponding to a total opening of the appropriate valve 21 or 22.

Figure 4:
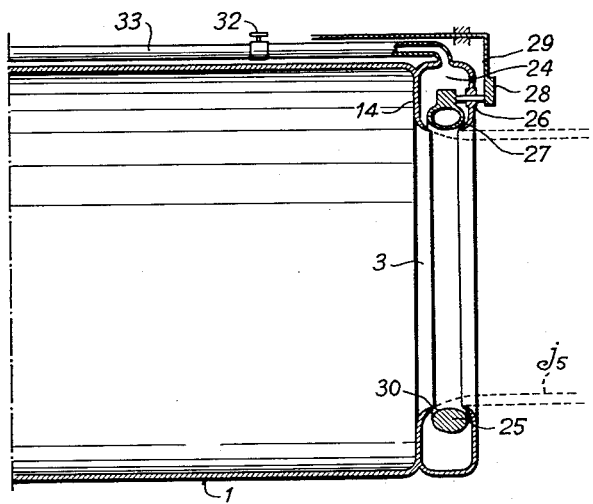

FIGURES 4 and 5 show a variant of the preceding nozzle, wherein the peripheral striction and blowing jets $j_4$ and $j_5$ respectively are fed from one space 24. The change from striction operation to blowing operation is effected by axial movement of an annular member 25 fixedly mounted on supports 26, which are adapted to slide along the axis of the nozzle in bores formed at intervals along the downstream wall 27 of the space 24. A ring 28 fast with the supports 26 is arranged to be axially moved by one or more systems of levers 29 provided at intervals around the nozzle and themselves actuated by any known means. When the ring 25 is pushed to the maximum extent in the downstream direction, it opens the blowing slot 30 (FIGURE 4). Conversely, when it is pushed to the maximum extent in the upstream direction (FIGURE 5) it opens the striction slot 31.

The valve 32 in the pipe 33 permits of regulating the action of the striction or of the blowing.

The ring 25 may also be arranged to have a dissymmetrical action in order to deflect selectively the jet issuing from the outlet 3. This can be achieved by providing for an angular displacement of the ring 25 about a diametrical axis, i.e., an axis perpendicular to the longitudinal axis of the jet propulsion nozzle.

FIGURE 6 illustrates such an arrangement. The control members of the ring 25 are duplicated as shown at 28a—29a and 28b—29b and act on diametrically opposite joints of the ring through any convenient linkage, for example, a short rod 34 connected, through a ball-and-socket joint 35, with a finger 36 slidably engaged in a recess 37 formed at opposite points of the ring 25.

The operation of this modified arrangement is as follows:

If the control members 29a and 29b are operated simultaneously and equally, the ring 25 is displaced parallel to the longitudinal axis of the jet propulsion nozzle, as in the case of the embodiment of FIGURES 4 and 5. However, if the control members 29a and 29b are operated either not simultaneously or not equally, the ring 25 will take a certain inclination on the normal transverse plane by undergoing an angular displacement about a diametrical axis perpendicular to the diameter through the recesses 37.

What I claim is:

1. A device for controlling the outlet section of a jet propulsion unit, comprising an inwardly projecting annular manifold at said outlet section forming an annular barrier which constitutes a diaphragm reducing the effective area of said outlet, said annular manifold having a slotlike opening extending along its inner periphery and bounded by smoothly curved lips bent towards each other, a movable ring substantially concentric with and accommodated within said annular manifold for partially obstructing said opening while leaving a gap with one lip or the other of said opening, said ring having a curved outline substantially fitting with said curved lips, and controllable means for supplying pressure fluid to said manifold.

2. A device as claimed in claim 1, wherein the ring is movable parallel to the axis of the annular manifold.

3. A device as claimed in claim 2, wherein the ring is further movable angularly about an axis perpendicular to the axis of the annular manifold.

References Cited in the file of this patent

UNITED STATES PATENTS

| | | |
|---|---|---|
| 1,620,707 | Wunsch | Mar. 15, 1927 |
| 2,408,603 | Braithwaite et al. | Oct. 1, 1946 |
| 2,703,959 | Wetherbee | Mar. 15, 1955 |
| 2,763,984 | Kadosch et al. | Sept. 25, 1956 |
| 2,780,056 | Colley | Feb. 5, 1957 |
| 2,812,636 | Kadosch et al. | Nov. 12, 1957 |

FOREIGN PATENTS

| | | |
|---|---|---|
| 65,303 | France | Oct. 5, 1955 |
| | (Addition to 1,030,483) | |
| 1,140,440 | France | Mar. 4, 1957 |
| 745,697 | Great Britain | Feb. 29, 1956 |
| 759,659 | Great Britain | Oct. 24, 1956 |